US006945685B1

(12) United States Patent
Sokolov et al.

(10) Patent No.: US 6,945,685 B1
(45) Date of Patent: Sep. 20, 2005

(54) LIGHT CHAMBER FOR DOOR FOR GAMING MACHINE

(75) Inventors: Richard Sokolov, Kingsford (AU); Errol D'Souza, Hornsby (AU); Vladimir Halic, Wollongong (AU); Ian Frederick Johnson, Pennant Hills (AU)

(73) Assignee: Aristocrat Technologies Australia Pty Ltd., New South Wales (AU)

( * ) Notice: Subject to any disclaimer, the term of this patent is extended or adjusted under 35 U.S.C. 154(b) by 0 days.

(21) Appl. No.: 10/130,081

(22) PCT Filed: Nov. 8, 2000

(86) PCT No.: PCT/AU00/01369

§ 371 (c)(1),
(2), (4) Date: Dec. 3, 2002

(87) PCT Pub. No.: WO01/34262

PCT Pub. Date: May 17, 2001

(30) Foreign Application Priority Data

Nov. 11, 1999 (AU) .................................. PQ3989

(51) Int. Cl.[7] .............................................. F21V 8/00
(52) U.S. Cl. ...................... 362/632; 362/605; 362/633; 362/634
(58) Field of Search .......................... 362/31, 253, 812, 362/217, 260, 269, 374; 40/723–724, 733, 40/574, 546

(56) References Cited

U.S. PATENT DOCUMENTS 4,070,779 A    1/1978  Gilmour
4,795,155 A    1/1989  Grande
5,394,308 A *  2/1995  Watanabe et al. ............. 362/31
5,546,687 A *  8/1996  Iorfida ......................... 40/546
6,210,013 B1 * 4/2001  Bousfield .................... 362/92
6,568,821 B1 * 5/2003  Page et al. ................... 362/31

FOREIGN PATENT DOCUMENTS

EP       438768 A    7/1991
EP       561329 A    9/1993
GB      2030750 A    4/1980

* cited by examiner

Primary Examiner—Sandra O'Shea
Assistant Examiner—Guiyoung Lee
(74) Attorney, Agent, or Firm—Knobbe, Martens, Olson & Bear LLP

(57) ABSTRACT

A belly door for a gaming machine includes a frame for receiving a sheet of artwork and a light reflective chamber having an open face which is located behind the frame when in a closed position. Clamping means are provided for clamping the artwork between the frame and the chamber. A recess extends along one edge of the chamber including sockets for receiving a fluorescent light tube when the chamber is in the closed position. A diffuser panel is disposed in the chamber behind the artwork located so as to be edge lit by the fluorescent light tube. The reverse face of the panel, which in use, faces the rear wall of the chamber defines a series of white opaque dots which in use, diffuse and direct the light in a forward direction perpendicular to the plane of the panel. The size of the dots in the panel increases with the distance of the dots from the fluorescent light tube. This arrangement ensures that the light panel produces a very evenly balanced lighting of the artwork.

14 Claims, 7 Drawing Sheets

LIGHT CHAMBER FOR DOOR FOR GAMING MACHINE

CROSS-REFERENCE TO RELATED APPLICATIONS

This application is a National Phase application of PCT/AU00/01369 filed on Nov. 8, 2000, the disclosure of which is incorporated herein by reference in its entirety and claims the benefit of the Australian application PQ 3989 filed November 11, 1999, and is related to and filed concurrently with application Ser. No. 10/130,172, which is a National Phase Application of PCT. Application no. PCT/00/01371.

FIELD OF THE INVENTION

This invention relates to gaming machines also referred to as slot machines, fruit machines or poker machines and in particular, it relates to a light chamber assembly for such as a gaming machine.

BACKGROUND OF THE INVENTION

A typical upright gaming machine comprises a cabinet and a main door which swings open on hinges to allow access to the interior of the cabinet. The main door may extend almost the entire length of the cabinet from its top to its bottom. In the middle of the door, there is usually a shelf area on which a number of control buttons are located for use by a player. Often, a bill acceptor is disposed beneath the shelf and a slot is provided in the shelf area allowing players to feed notes into the bill acceptor. It is common to have a door attached to the main door beneath the shelf, which is commonly referred to as a "belly door". The belly door allows access to the interior of the lower part of the gaming machine without the need to open the main door. Also "artwork" for the machine is usually displayed in the belly door. The artwork for the belly door usually comprises a sheet of optical quality acrylic material on which a design identifying the game is screen printed. The artwork may be edge lit by a fluorescent tube which is usually mounted in an assembly fixed to one vertical edge of the artwork.

Some designs include a horizontally oriented tube. One problem which arises is that the bill acceptor depends down from the shelf behind the belly door and this prevents a horizontally mounted fluorescent light tube from extending from one horizontal end of the artwork to the other horizontal end. Because it is not possible to light the artwork between the artwork and the bill acceptor, there is typically a shadow behind the artwork where the bill acceptor is positioned.

In some gaming machines, two fluorescent light tubes are provided, one mounted in a horizontal orientation behind the artwork and one mounted in a vertical orientation behind the artwork. However, this still produces uneven lighting and in particular, produces "hot spots" which are more backlit than other areas of the artwork.

The vertically mounted fluorescent tube mounted to the edge of the artwork discussed above, provides more even lighting. The tube is enclosed in a chamber having a C shaped cross-section which pivots about a mounting fitted along one edge of the artwork. The fluorescent light is positioned close to one edge of the belly door. It is a difficult and fiddly process to pivot the chamber, disconnect and remove the fluorescent light and replace it with another tube. Typically, it can take an engineer 15 minutes to change the artwork and fluorescent light tube.

It is an object of the present invention to alleviate the above mentioned disadvantages of the prior art.

SUMMARY OF THE INVENTION

Thus, in a first aspect of the present invention, there is provided a belly door assembly for a gaming machine comprising:

a frame for receiving a sheet of artwork or the like;

a light reflective chamber having an open face which is hinged to and positionable behind the frame in a closed position;

means for clamping the artwork between the frame and the chamber;

socket means for mounting an elongate light means on the frame adjacent one edge of the frame;

a recess extending along an edge of the chamber adapted to receive an elongate light means mounted in the socket means when the chamber is closed behind the frame; and a diffuser panel disposed in the chamber behind the frame arranged to be edge lit by an elongate light means when such an elongate light means is mounted in the socket means.

In a preferred embodiment, a diffuser panel is disposed in the chamber behind the artwork located so as to be edge lit by the fluorescent light tube. The panel may have a first (front) face and a second (reverse) face. The reverse face of the panel, which in use, faces the rear wall of the chamber, may define a series of white opaque dots which in use, diffuse and direct the light in a forward direction perpendicular to the plane of the panel. Preferably, the size of the dots in the panel increases with the distance of the dots from the fluorescent light tube. This arrangement ensures that the light panel produces a very evenly balanced lighting. The fluorescent light tube is preferably 7 mm diameter.

The panel may be supported by a series of ribs projecting from the rear wall of the light reflective chamber.

The clamping means may comprise rotatable locking means defining wedge or cam surfaces co-operating with lugs defined on the frame.

It is preferred that the artwork is clamped between two gently curved surfaces defined by the frame and the chamber respectively.

The chamber is preferably hinged to the frame.

BRIEF DESCRIPTION OF THE DRAWINGS

The invention will now be described, by way of example only, and with reference to the accompanying drawings in which:—

DETAILED DESCRIPTION OF PREFERRED EMBODIMENT

Figure 1:
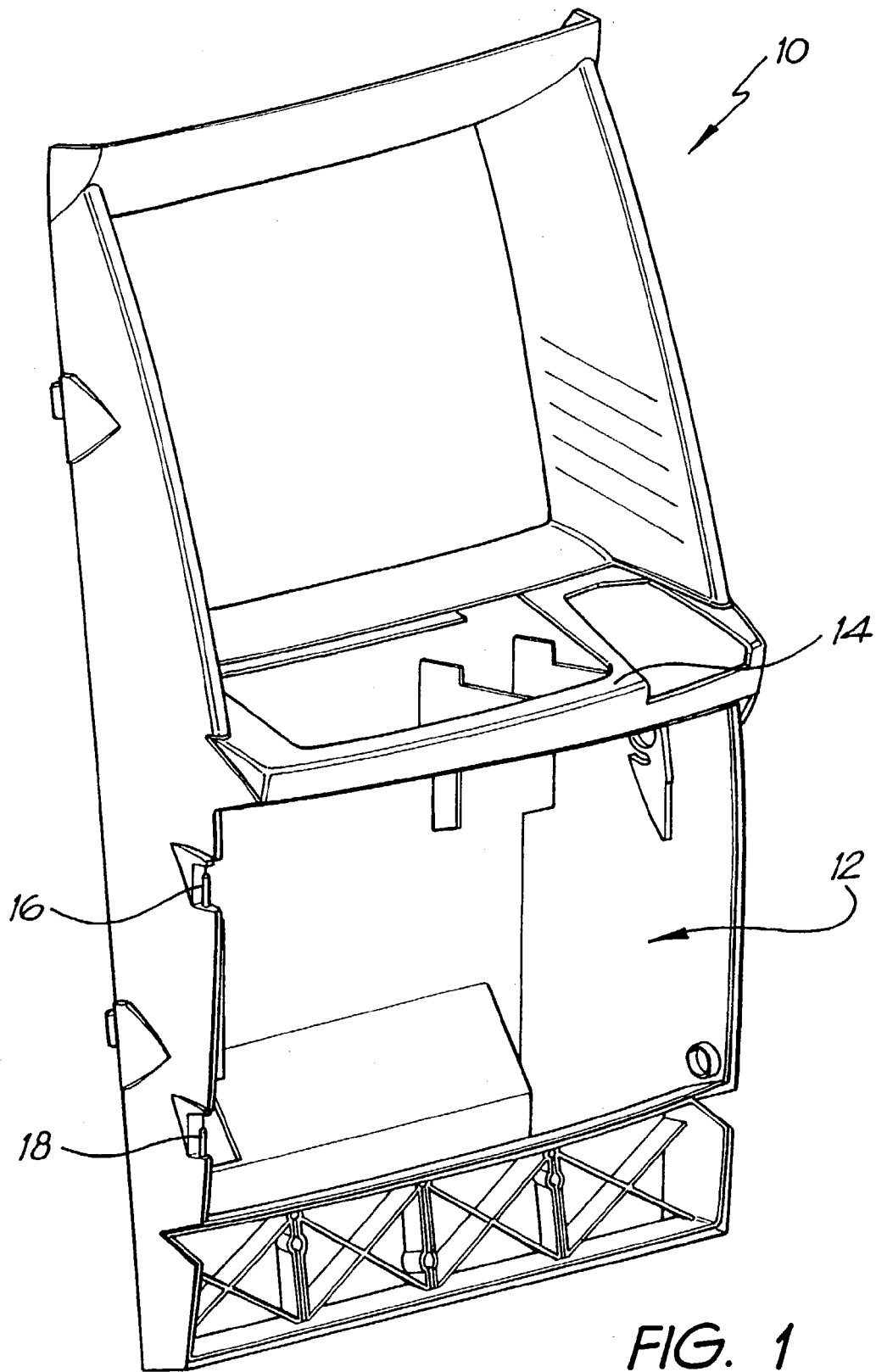
FIG. 1 shows a main door for a gaming machine.

Referring to the drawings. FIG. 1 shows a main door 10 for a gaming machine. The basic door 10 is shown before trim and other components are fitted. The door has an aperture 12 located below a shelf 14 on which control buttons are located on the finished door. The aperture is openable and closeable by a door known as a "belly door" (not shown in FIG. 1). The components of the belly door are shown in FIGS. 2 to 6. The belly door is mounted to the main door on two upstanding hinge pins 16, 18 disposed on one side of the aperture 12 of the door.

Figure 2:
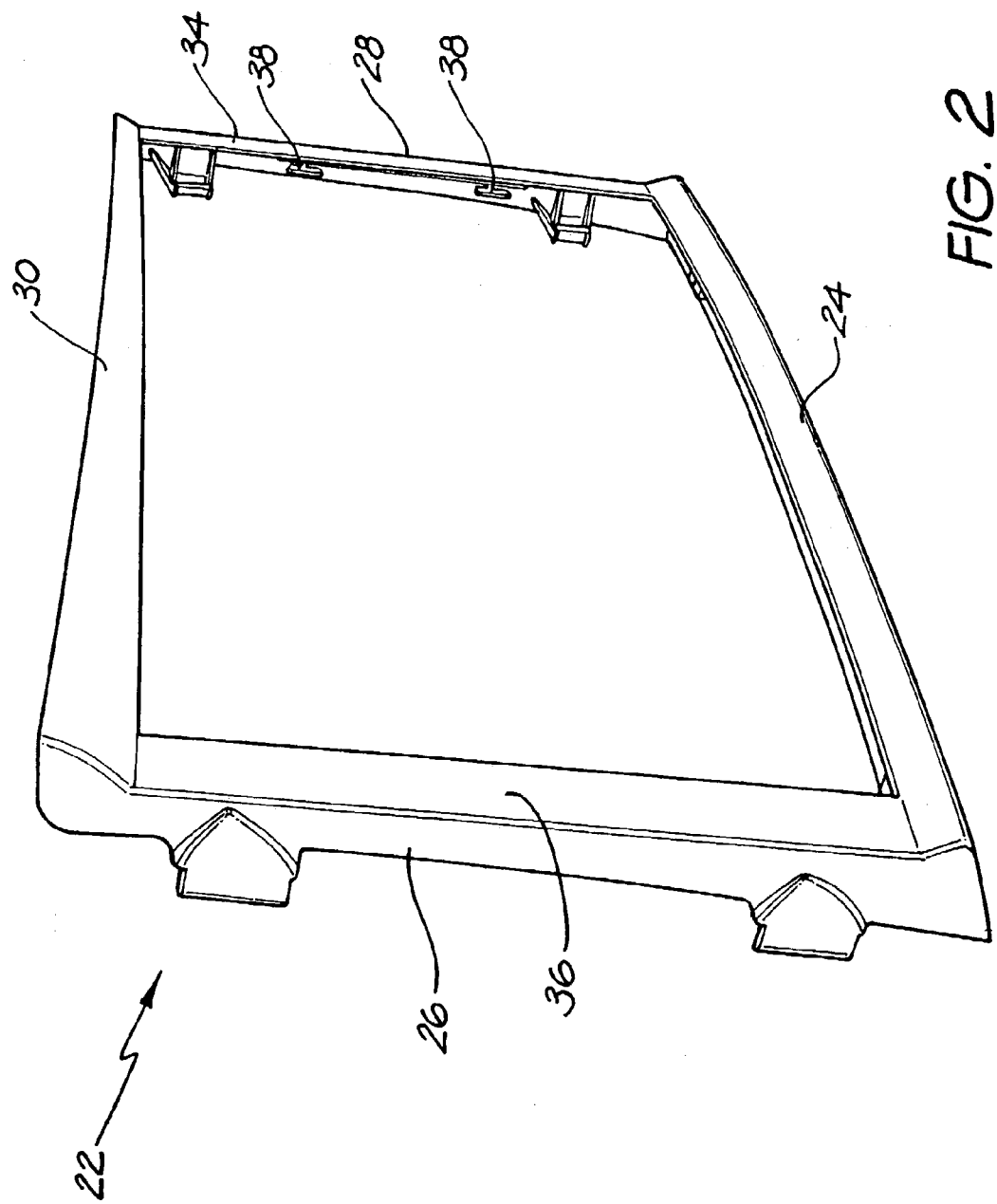
FIG. 2 shows a front view of a frame for a belly door for the main door shown in FIG. 1.
Figure 3:
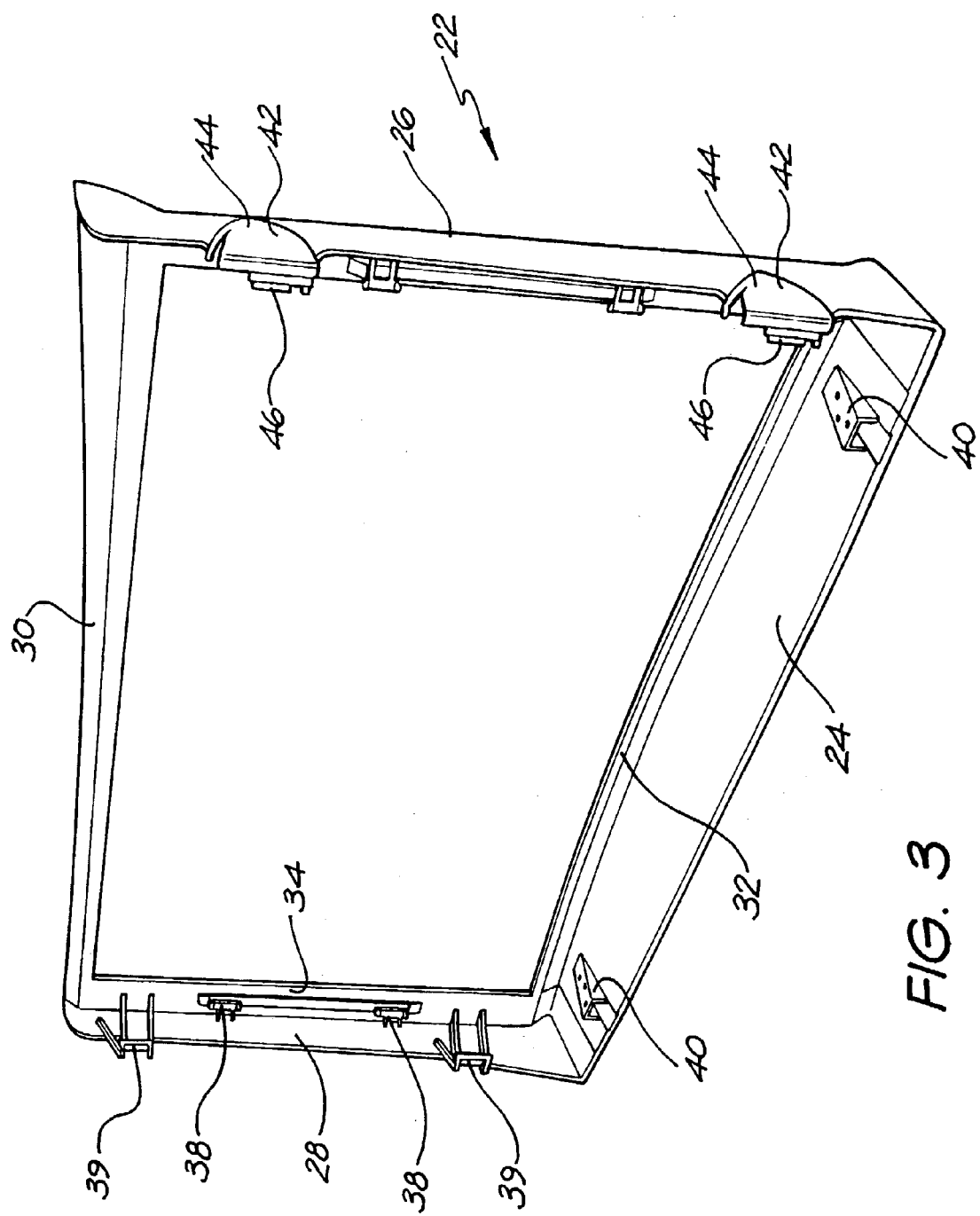
FIG. 3 shows a rear view of the frame for the belly door shown in FIG. 2.
Figure 4:
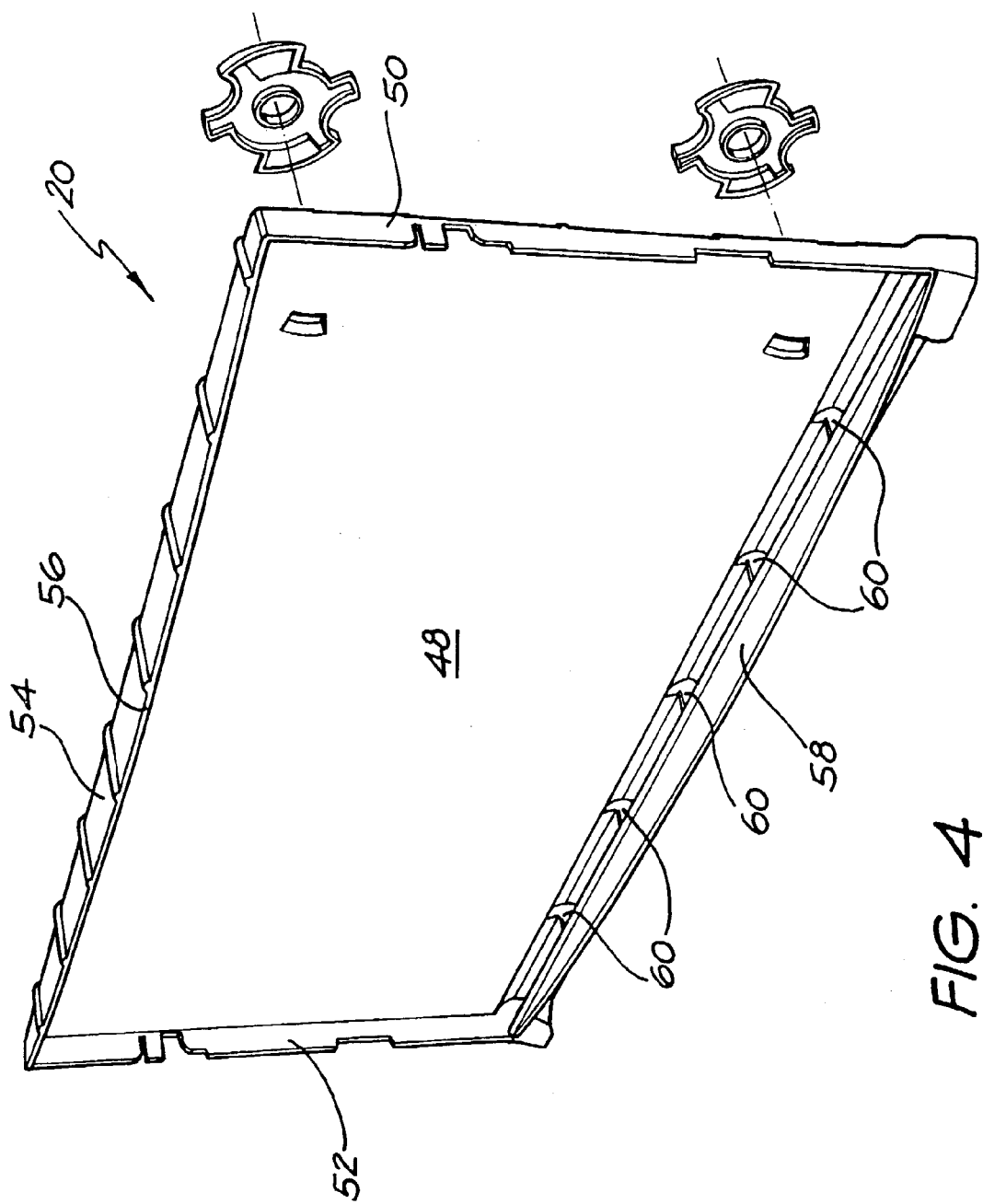
FIG. 4 shows a front view of a light chamber.
Figures 5, 5A:
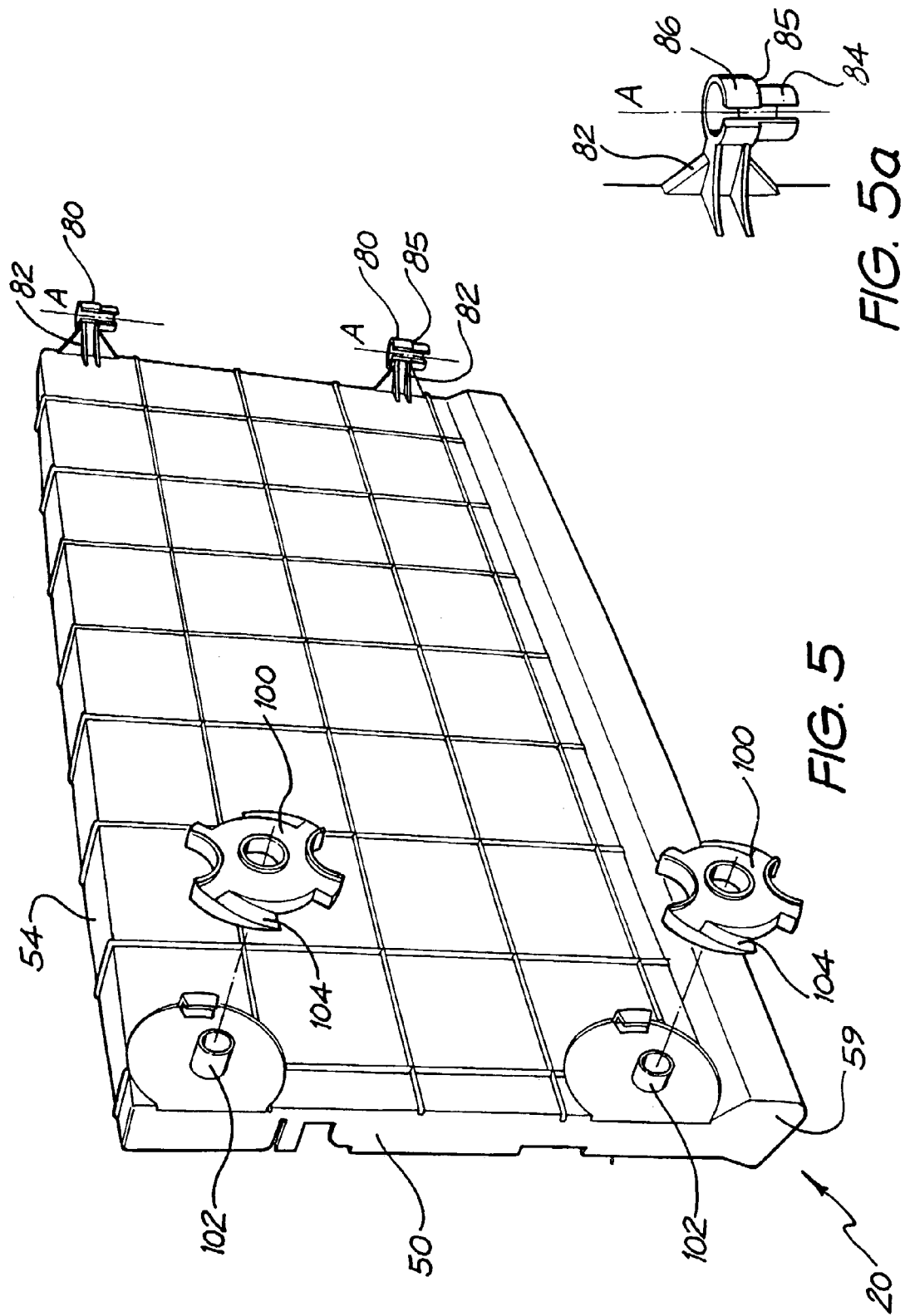
FIG. 5 is a rear view of the light chamber shown in FIG. 4.
FIG. 5a is an enlarged view of a hinge component.
Figure 7:
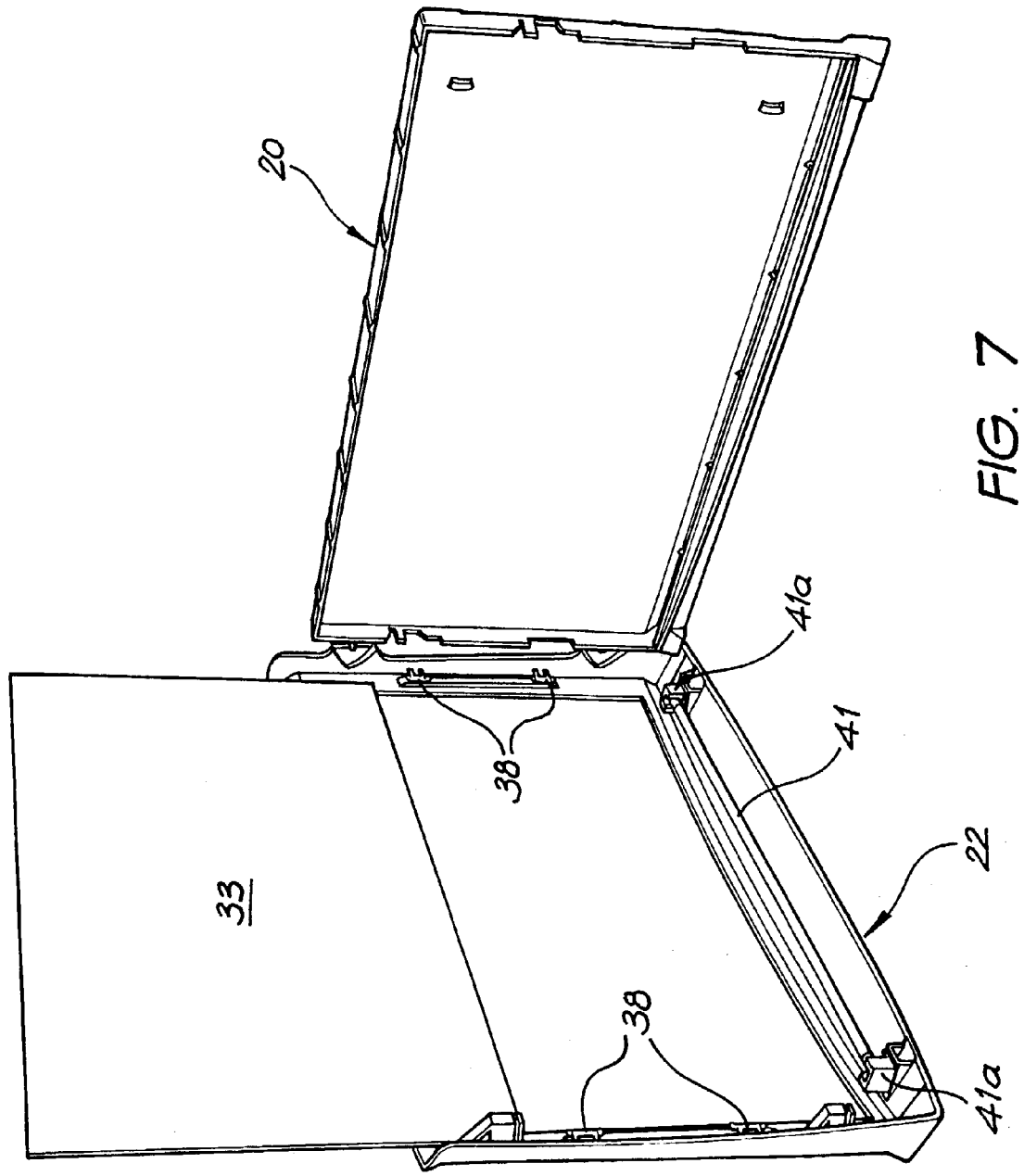
FIG. 7 is an assembled view of the belly door components.

The belly door includes two main components, a light chamber 20 shown in FIGS. 4 and 5 and an outer frame 22 which is shown in FIGS. 2 and 3. The frame comprises a base member 24, two side members 26, 28 and a top member 30. As is best seen in FIG. 3, a curved wall 32 extends along the front of the base member. A similar wall (not shown) depends downwardly from the top member of the frame. When viewed from the front of the belly door, the walls are convex and they define the upper and lower edges of a frame for receiving artwork 33 (refer to FIG. 7) which locates behind the walls.

Each side member 26, 28 defines an edge wall 34, 36, behind which two spaced projections 38 are provided which are oriented generally parallel to the edge wall but are spaced apart from the edge wall by a gap of typically about 5 to 10 mm. The gap should be wider than the thickness of a sheet of artwork so that the edges of the artwork which is to be displayed in the frame can fit between the projections and the edge walls. Thus in use, artwork 33, can be dropped into the door frame from above with the edges of the art work being loosely retained (until clamped, as is explained below) between the projections 38 and the edge walls.

Also shown in FIG. 3, are two mounts 40, onto which an elongate light means in the form of a fluorescent light tube 41 and a socket assembly 41a for mounting the light (not shown in FIG. 3, refer to FIG. 7) is mounted using screws. The fluorescent light has a diameter of about 7 mm.

The belly door frame is hinged to the main door in conjunction with the light chamber on the hinge pins 16, 18 in a manner which will be described in more detail below. FIG. 3 shows two outer sleeves 42 which in use, mount on the hinge pins 16, 18. The outer sleeves 42 are generally part annular in shape. These, comprise an outer hinge sleeve 44 and inner hinge sleeve 46 with a gap there between for receiving the hinge pins as is described below. The outer sleeve element 44 is taller than the inner sleeve element 46.

Also provided on one side member 28 of the frame is a pair of spaced lugs 39.

The light chamber 20 is best seen in FIGS. 4 and 5. The light chamber is preferably made from a white coloured plastics material. The light chamber has a generally planar rear wall 48 with side walls 50, 52 and a top wall 54. The front edge 56 of the top wall is convex and curved to match the curved wall at the top of the frame 20. At the base of the chamber, an elongate channel or recess 59, best seen in FIG. 5, is defined. The channel extends the entire length of the base of the chamber and is sized and configured to receive the fluorescent light tube 41 and socket assembly 41a which is mounted to the frame 20. A projecting clamp element 58 is disposed above the channel and, as best seen in FIG. 4, curves outwardly matching the curve of the wall 32 at the base of the frame 20. The protruding clamp element, does not extend back as far as the rear wall 48 of the chamber but rather is mounted on a series of five projecting ribs 60 which space the wall element from the rear wall 48.

Figure 6:
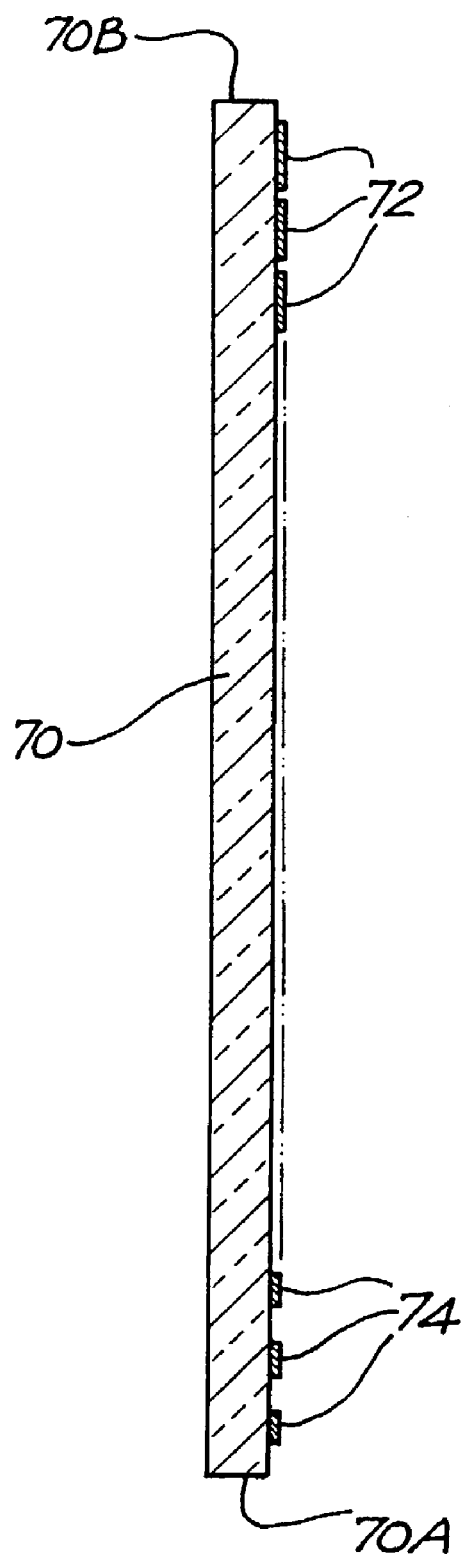
FIG. 6 shows a light diffuser panel.

A diffuser panel 70 illustrated in FIG. 6, locates in the chamber against the rear wall.

The diffuser panel is made of optical quality acrylic and has a series of opaque white dots screen printed onto the rear face of the panel. The dots 72 at the top 70B of the panel have a greater diameter than those at the bottom 70A of the panel. Typically, the smaller dots have a diameter of about 0.3 mm, and are well spaced apart with the size gradually increasing up the panel and the spacing decreasing to the relatively largest dots 72 having a diameter of about 0.5 mm. The panel is 8 mm thick. FIG. 6 is stylised and does not represent the actual dimensions of the panel or dots. When the bottom edge 70A of the panel is lit by the fluorescent light, light travels up the panel and is diffused and reflected forwards by the series of white dots to provide a very even diffuse light source from the panel which takes account of the gradual reduction in the amount of light transmitted up the panel from the tube. Consequently, any art work held in the door frame in front of the panel is evenly lit.

With reference to FIG. 5, two hinge elements 80 extend away from one side wall 52 of the chamber on arms 82. The hinge elements are shown enlarged in FIG. 5a. Each element has a part annular cross section comprising a first upper portion 86 having a diameter which steps down at a shoulder 85 to a lower portion 84 having a slightly narrower diameter. The walls of the hinge element are arcuate and extend around an angle of approximately 270° defining a gap between the free ends of the hinge element. The hinge element locates within the sleeve elements provided in the frame, with the shoulder 85 resting on the top of the inner sleeve element 46. This allows the light chamber 22 to rotate about the hinge axis A relative to the frame 20. When the door frame and chamber are swung about to a particular relative orientation, gaps in the outer sleeves 42 and the hinge elements 80 align and in this orientation, the chamber and frame can be mounted onto the hinge pins defined on the main door. Thus, the main door, the frame and the chamber may all rotate relative to each other about the same hinge axis A.

The chamber is locked in position to the reverse side of the belly door frame by means of a pair of rotatable locking cam means 100 which are mounted on bosses 102 formed on the reverse side of the chamber. Each locking means defines a wedge or cam surface 104 which co-operates with the lugs 39 defined on the side frame of the belly door to gradually compress the artwork as it is turned. This has the effect of pushing the light chamber against the rear of the front face of the frame. The art work is held securely between the chamber and the door frame and is gripped and curved between the curved walls of the frame and the projections of the chamber.

The design of the door frame has a number of significant advantages. The principal advantage is that it is much easier to access the components of the belly door which need changing, in particular, the art work, which is changed whenever the game played on the gaming machine is changed. It is also a relatively simple matter to access and change the fluorescent light as only one light is required and it conveniently located at the base of the frame of the belly door frame.

The use of a thinner fluorescent tube allows the chamber in the belly door to be relatively thin and it can thus extend in front of the bill acceptor avoiding the shadow problem associated with the bill acceptor in existing gaming machines.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A door assembly for a gaming machine comprising:
    a frame for receiving a sheet of artwork;
    a light reflective chamber having an open face which is hinged to and positionable behind the frame in a closed position;
    a clamping member for clamping the artwork between the frame and the chamber;
    a socket member for mounting an elongate light member on the frame adjacent an edge of the frame;
    a recess extending along an edge of the chamber adapted to receive the elongate light member mounted in the socket member when the chamber is closed behind the frame; and
    a diffuser panel disposed in the chamber behind the frame arranged to be edge lit by the elongate light member when the elongate light member is mounted in the socket member.

2. An assembly as claimed in claim 1, further including a sheet of artwork and wherein the diffuser panel is disposed in the chamber behind the artwork.

3. An assembly as claimed in claim 1, wherein the diffuser panel has a front face and a reverse and wherein the reverse face of the panel faces a rear wall of a chamber and defines a series of white opaque dots which diffuse and direct the light in a forward direction perpendicular to the plane of the panel.

4. An assembly as claimed in claim 3, wherein the white opaque dots on the panel increase in size with the distance of the dots from the elongate light member.

5. An assembly as claimed in claim 1, wherein the elongate light member is a fluorescent light tube having a diameter of about 7 mm.

6. An assembly as claimed in claim 3, wherein the diffuser panel is supported by a series of ribs projecting from the rear wall of the light reflective chamber.

7. An assembly as claimed in claim 1, wherein the clamping member includes a rotatable locking element defining wedge or cam surfaces co-operating with lugs defined on the frame adapted to clamp artwork between curved surfaces defined by the frame and the chamber respectively.

8. An assembly as claimed in claim 1, wherein the socket member extends along a lower edge of the frame and the light tube is horizontally oriented.

9. A door assembly for a gaming machine comprising:
    a frame;
    a sheet of artwork located in the frame;
    a light reflective chamber having an open face which is hinged to and positionable behind the frame in a closed position;
    a clamping member for clamping the artwork between the frame and the chamber;
    a socket member for mounting an elongate light member on the frame adjacent an edge of the frame;
    a recess extending along an edge of the chamber adapted to receive the elongate light member mounted in the socket member when the chamber is closed behind the frame; and
    a diffuser panel disposed in the chamber behind the frame and sheet of artwork arranged to be edge lit by an elongate light member mounted in the socket member, the diffuser panel having a front face and a reverse face wherein the reverse face of the panel faces a rear wall of the chamber and defines a series of white opaque dots which diffuse and direct the light in a forward direction perpendicular to the plane of the panel.

10. An assembly as claimed in claim 9, wherein the dots of the panel increase in size with the distance of the dots from the elongate light member.

11. An assembly as claimed in claim 9, wherein the elongate light member is a fluorescent light tube having a diameter of about 7 mm.

12. An assembly as claimed in claim 9, wherein the diffuser panel is supported by a series of ribs projecting from the rear wall of the light reflective chamber.

13. An assembly as claimed in claim 9, wherein the member for clamping includes a rotatable locking member, defining wedge or cam surfaces co-operating with lugs defined on the frame adapted to clamp artwork between curved surfaces defined by the frame and the chamber respectively.

14. An assembly as claimed in claim 11, wherein the socket member extends along a lower edge of the frame and the fluorescent light tube is horizontally oriented.

* * * * *

UNITED STATES PATENT AND TRADEMARK OFFICE
CERTIFICATE OF CORRECTION

PATENT NO. : 6,945,685 B1
DATED : September 20, 2005
INVENTOR(S) : Sokolov et al.

It is certified that error appears in the above-identified patent and that said Letters Patent is hereby corrected as shown below:

<u>Column 5,</u>
Line 29, after "reverse" insert -- face --.
Line 30, after "wall of" delete "a" and insert -- the --.
Line 31, after "which" insert -- in use, --.

Signed and Sealed this

Twenty-first Day of March, 2006

JON W. DUDAS
*Director of the United States Patent and Trademark Office*